United States Patent
Maclaskey et al.

(10) Patent No.: US 11,597,461 B1
(45) Date of Patent: Mar. 7, 2023

(54) LIFT SYSTEM

(71) Applicants: Charles William Maclaskey, Gridley, KS (US); Clara Evelyn Maclaskey, Gridley, KS (US)

(72) Inventors: Charles William Maclaskey, Gridley, KS (US); Clara Evelyn Maclaskey, Gridley, KS (US)

( * ) Notice: Subject to any disclaimer, the term of this patent is extended or adjusted under 35 U.S.C. 154(b) by 0 days.

(21) Appl. No.: 17/678,736

(22) Filed: Feb. 23, 2022

(51) Int. Cl.
*B62H 3/08* (2006.01)
*B62H 3/04* (2006.01)
*B62H 3/12* (2006.01)
*B66F 7/02* (2006.01)

(52) U.S. Cl.
CPC ............... *B62H 3/08* (2013.01); *B62H 3/04* (2013.01); *B62H 3/12* (2013.01); *B66F 7/02* (2013.01)

(58) Field of Classification Search
CPC ... B62H 3/00; B62H 3/04; B62H 3/08; B62H 3/12; B66F 7/28; B66F 7/02
See application file for complete search history.

(56) References Cited

U.S. PATENT DOCUMENTS

| | | | | |
|---|---|---|---|---|
| 672,070 | A * | 4/1901 | Smith | B62H 3/12 410/3 |
| 3,907,113 | A * | 9/1975 | Kropelnitski | B62H 3/12 414/227 |
| 4,015,718 | A * | 4/1977 | Bernard | B62H 3/08 211/20 |
| 11,091,213 | B2 * | 8/2021 | Flynn | B62H 3/12 |
| 11,407,623 | B2 * | 8/2022 | Boggess | B66F 7/28 |
| 2011/0000745 | A1 * | 1/2011 | Good | B66F 7/28 187/210 |

* cited by examiner

*Primary Examiner* — Ko H Chan
(74) *Attorney, Agent, or Firm* — Blake E. Vande Garde; Avek IP, LLC (57) ABSTRACT

A lift and storage device comprising, a base, a support structure secured to and emanating up from the base, a travelling assembly operationally associated with the support structure, a drive assembly operationally associated with the support structure and the travelling assembly, a support arm secured to and operationally associated with the travelling assembly, and engaged with a support tray comprising, a horizontal support member secured to the support arm, a front tire support assembly secured to the horizontal support member, a rear tire support assembly secured to the horizontal support member, the rear tire support assembly comprising a pair of adjustment rails secured to the horizontal support member, a pair of slide rails secured to the pair of adjustment rails and a pair of support rails slidably engaged with the pair of slide rails and a clamping assembly operationally associated with pair of support rails.

20 Claims, 7 Drawing Sheets

LIFT SYSTEM

FIELD OF INVENTION

This invention pertains to storage and lift systems and more specifically to storage and lift systems which can elevate one or more bicycles or other materials off the ground to store them while preserving floor space and room mobility.

BACKGROUND OF THE INVENTION

Lift systems designed to store bicycles and other cumbersome items are available in a wide variety of designs. Typically, lift systems are used to temporarily park, store, or display items including bicycles, strollers, surf boards, paddle boards, and golf clubs. In some cases, lift systems are configured to facilitate locking items in place to secure them using items such as U-locks, cables, or chains.

While bicycle racks have traditionally been used in places like parks, libraries, and other building entrances, the use of bicycle racks indoors in garages or under raised buildings (i.e., beach homes) has dramatically increased. In some cases, bicycles are being used as a primary mode of transportation in vacation areas. As a result, a need has arisen to provide parking and/or temporary storage of bicycles in a higher density than what was previously available through conventional bicycle racks.

One solution to this need is a bicycle rack for storing bicycles off the ground where limited space is available. Typically, off the ground storage racks include hooks that engage the wheel rim, or pairs of arms that engage the horizontal bar of the bicycle frame between the seat post and the handle bars (or the goose neck of the handle bars). Typically, the hooks and arms are anchored to the wall or ceiling of a storage shed or shelter and the bicycle is lifted into position on the rack. These systems can be difficult to use and to raise one or more bicycles or other large items any significant distance off of the ground will require carrying the item up a ladder putting both the owner and the equipment at risk of falling resulting in injury.

In view of the above, it is an object of the present invention to provide a lift system that enables elevated bicycle storage while assuming a minimal operating footprint.

It is another object of the present invention to provide an elevated lift system which facilitates simple loading and unloading of bicycles and other cumbersome items.

It is another object of the present invention to provide a lift system which maximizes bicycle storage density while minimizing the required operating footprint area for the system.

Thus, there is clearly a need for a storage and lift system which can elevate one or more bicycles or other materials off the ground to store them while preserving floor space and room mobility.

SUMMARY OF THE INVENTION

A lift and storage device comprising, a base, a support structure secured to and emanating up from the base, a travelling assembly operationally associated with the support structure, a drive assembly operationally associated with the support structure and the travelling assembly, a support arm secured to and operationally associated with the travelling assembly, and engaged with a support tray comprising, a horizontal support member secured to the support arm, a front tire support assembly secured to the horizontal support member, a rear tire support assembly secured to the horizontal support member, the rear tire support assembly comprising a pair of adjustment rails secured to the horizontal support member, a pair of slide rails secured to the pair of adjustment rails and a pair of support rails slidably engaged with the pair of slide rails and a clamping assembly operationally associated with pair of support rails.

DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

The current invention addresses numerous issues with the prior art and includes for a lift and storage device which can elevate one or more bicycles or other materials off the ground to store them while preserving floor space and room mobility. Referring to the figures, where like numerals refer to like elements, there is shown a lift and storage device 10 comprising a base 15, a support structure 20 secured to and emanating up from the upper surface 16 of the base 15, a travelling assembly 35 operationally associated with the support structure 20, a drive assembly 50 operationally associated with the support structure 20 and the travelling assembly 35, wherein the drive assembly 50 raises and lowers the travelling assembly 50. A support arm is 60 secured to and operationally associated with the travelling assembly 50, the support arm 60 is designed for supporting a support tray 70 comprising a horizontal support member 71 secured to the support arm 60, a front tire support assembly 80 secured to a first end 72 of the horizontal support member 71, a rear tire support assembly 85 secured to the horizontal support member 71, the rear tire support assembly 85 comprising a pair of adjustment rails 86 secured to the horizontal support member 71, a pair of slide rails 88 mounted parallel to one another and secured to the pair of adjustment rails 86 and a pair of support rails 90 slidably engaged with the pair of slide rails 88. A clamping assembly 92 is operationally associated with the pair of support rails 90 to secure a tire within the rear tire support assembly 85. The rear tire support assembly 85 allows for the adjustment of a distance between the front tire support assembly 80 and the rear tire support assembly 85.

The base 15 of the current invention can be made from any material known in the art which can provide a stable platform. These materials include, metals, plastics, woods, polymers, ceramics, or a combination thereof. The base 15 includes an upper surface 16 and a lower surface (not shown) and may be freestanding or secured in place by any means know in the art including, but not limited to, adhesives, bolts, welds, fasteners, or the like.

The support structure 20 is secured to the upper surface 16 of the base 15. The support structure 20 includes one or more vertical members 21 which include a proximal end 22, a distal end 23, and a body 24. Each vertical member 21 of the current invention can be made from any material known in the art which can provide a stable platform to store bicycles and other cumbersome items. These materials include, metals, plastics, woods, polymers, ceramics, or a combination thereof. Each vertical member 21 can be secured in place by any means know in the art including, but not limited to, adhesives, bolts, welds, fasteners, or the like. Each vertical member 21 is secured at its proximal end 22 to the base 15 and emanates up and away from the base 15. The vertical member(s) 21 can be free standing, secured to a vertical surface (i.e., a wall), secured by its distal end 23 to the lower surface 31 of a top plate 30, or secured by its body 24 or its distal end 23 end to a horizontal surface (i.e., a ceiling, a rafter, a joist, etc.). In one embodiment of the current invention, the support structure further includes one or more lengths of angle iron secured to at least one or each vertical member 21 (not illustrated). The angle iron runs parallel to each vertical member 21 that it is secured to and resides within the channel 42 of the upper bracket 40 and lower bracket described below. In one embodiment of the current invention, the support structure further includes a pair of angle irons secured to each vertical member 21, wherein the angle irons are mounted on opposite sides of each vertical member, emanating outward from the vertical member.

The top plate 30 of the current invention can be made from any material known in the art which can provide a stable platform. These materials include, metals, plastics, woods, polymers, ceramics, or a combination thereof. The top plate 30 includes an upper surface (not shown) and a lower surface 31 and may be freestanding or secured in place by any means know in the art including, but not limited to, adhesives, bolts, welds, fasteners, or the like. The current invention may further include spacers and/or shims which can be placed between the upper surface of the top plate 30 and the ceiling. The spacers/shims may simply be inserted and held in place by friction or may work in conjunction with pairs of threaded holes drilled through the body of the top plate into which pairs of adjustable bolts would be engaged to press the spacer/shim into the ceiling and secure the top plate in place. In one embodiment, each spacer/shim may include one or more spikes or similar features emanating out from one side of the spacer/shim. The spike(s) are driven into the ceiling (drywall, wood, etc.) when the adjustable bolts are engaged to press the spacer/shim into the ceiling and secure the top plate in place while providing additional stability to the system.

A travelling assembly 35 is operationally associated with and is slidably engaged with the support structure 20. Looking to the figures, the travelling assembly is comprised of a primary support member 36 with an upper end 37, a lower end 39, and a middle 38. An upper bracket 40 is secured to or emanates from the upper end 37 of the primary support member 36. The upper bracket is formed from a pair of members secured to one another multiple locations along the length of its body 41 to form one or more channels 42 on either side of the primary support member. A lower bracket 45 is secured to or emanates from the lower end 39 of the primary support member 36. The lower bracket is formed from a pair of members secured to one another multiple locations along the length of its body 46 to form one or more channels 47 on either side of the primary support member. The channels 42, 47 of the upper bracket 40 and lower bracket 45 are aligned to allow a vertical member 21 to be inserted into the channels and allow the travelling assembly to slidably engage the vertical member(s) 21 of the support structure. The components of the travelling assembly 35 can be made from any material known in the art which can provide a stable platform. These materials include, metals, plastics, woods, polymers, ceramics, or a combination thereof. The pair of members that make of the upper bracket 40 and lower bracket 45 can be secured to one another by any means known in the art including, but not limited to, adhesives, bolts, welds, fasteners, or the like. In one embodiment of the instant invention, the travelling assembly further includes one or more bearings secured (i.e., v-groove bearings) within the channels 42, 47 of the upper bracket 40 and lower bracket 45. The bearings are designed to run along the vertical members 21 and/or the lengths of angle iron described previously (not illustrated). The bearings aid to secure the travelling assembly in place relative to the vertical members 21 and to allow the smooth travelling of the travelling assembly as it is raised and lowered.

Figure 1:
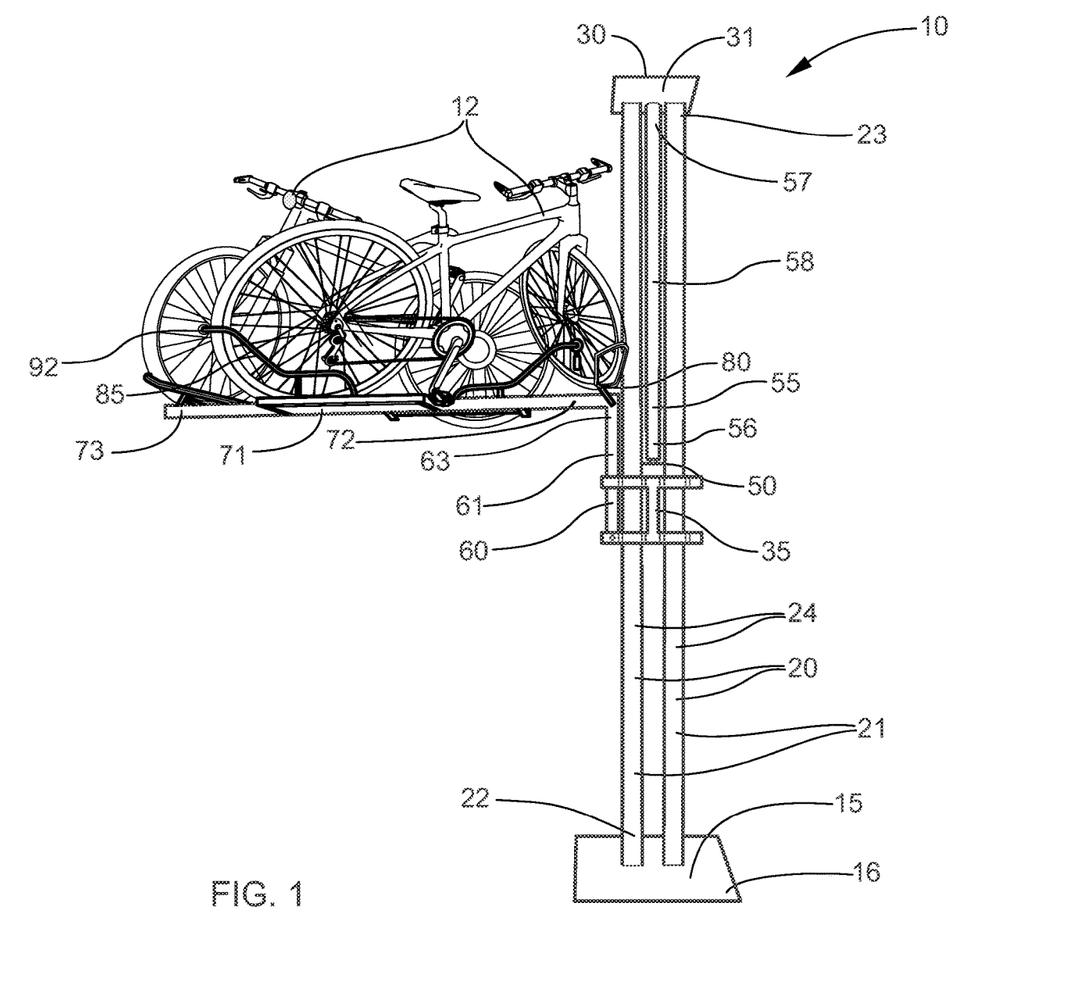
FIG. 1 illustrates a lift and storage device with a single support tray according to the invention.
Figure 2:
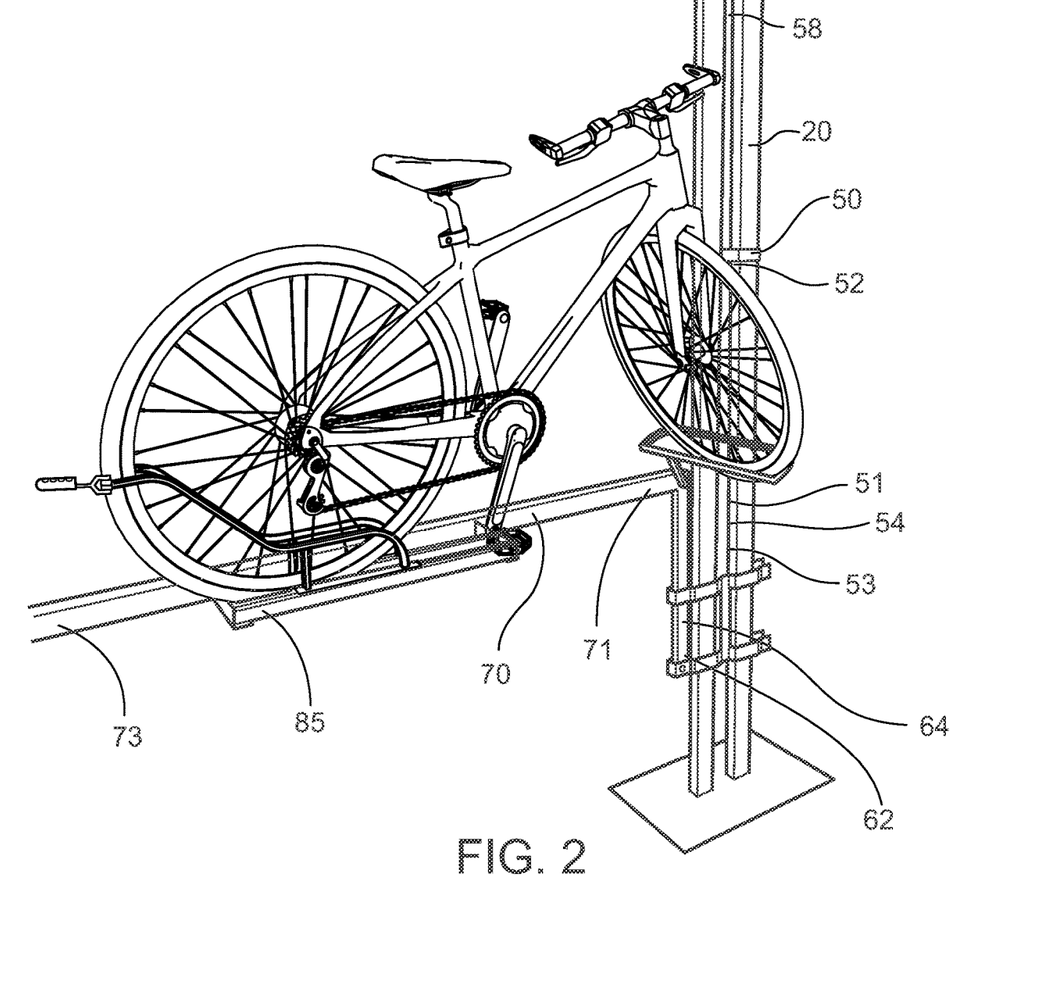
FIG. 2 illustrates a lift and storage device with a single support tray according to the invention.
Figure 3:
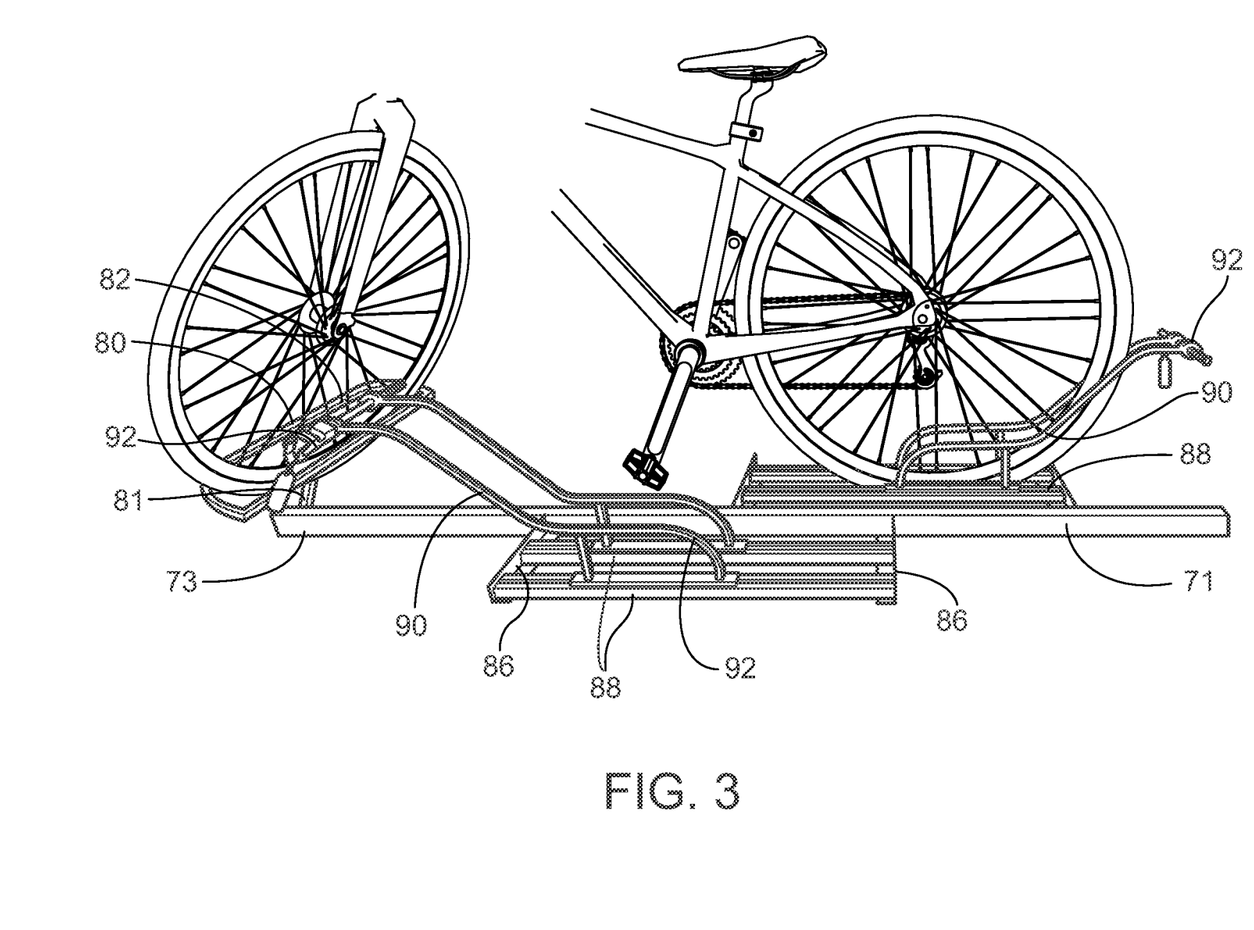
FIG. 3 illustrates a single support tray and its components of a lift and storage device according to the invention.
Figure 4:
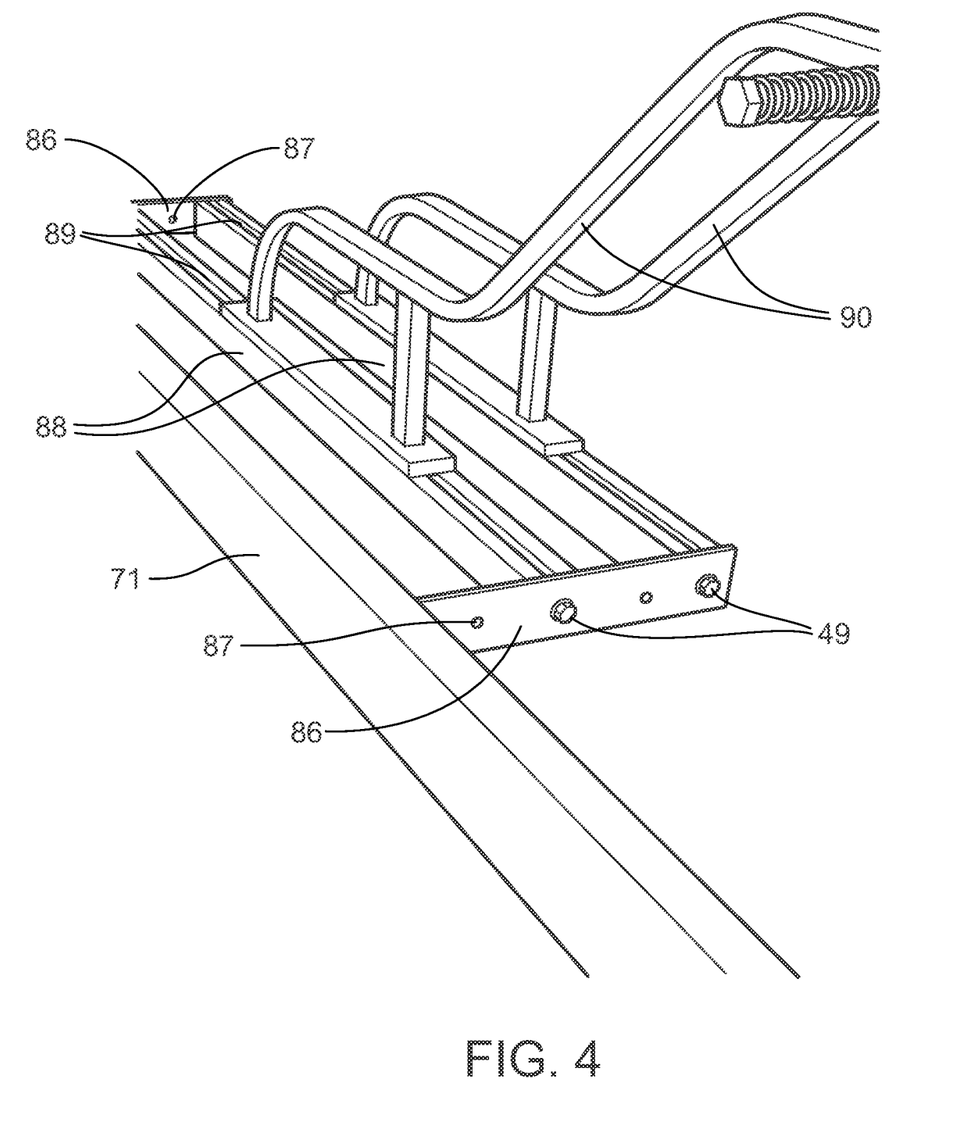
FIG. 4 illustrates a single support tray and its components of a lift and storage device according to the invention
Figure 5:
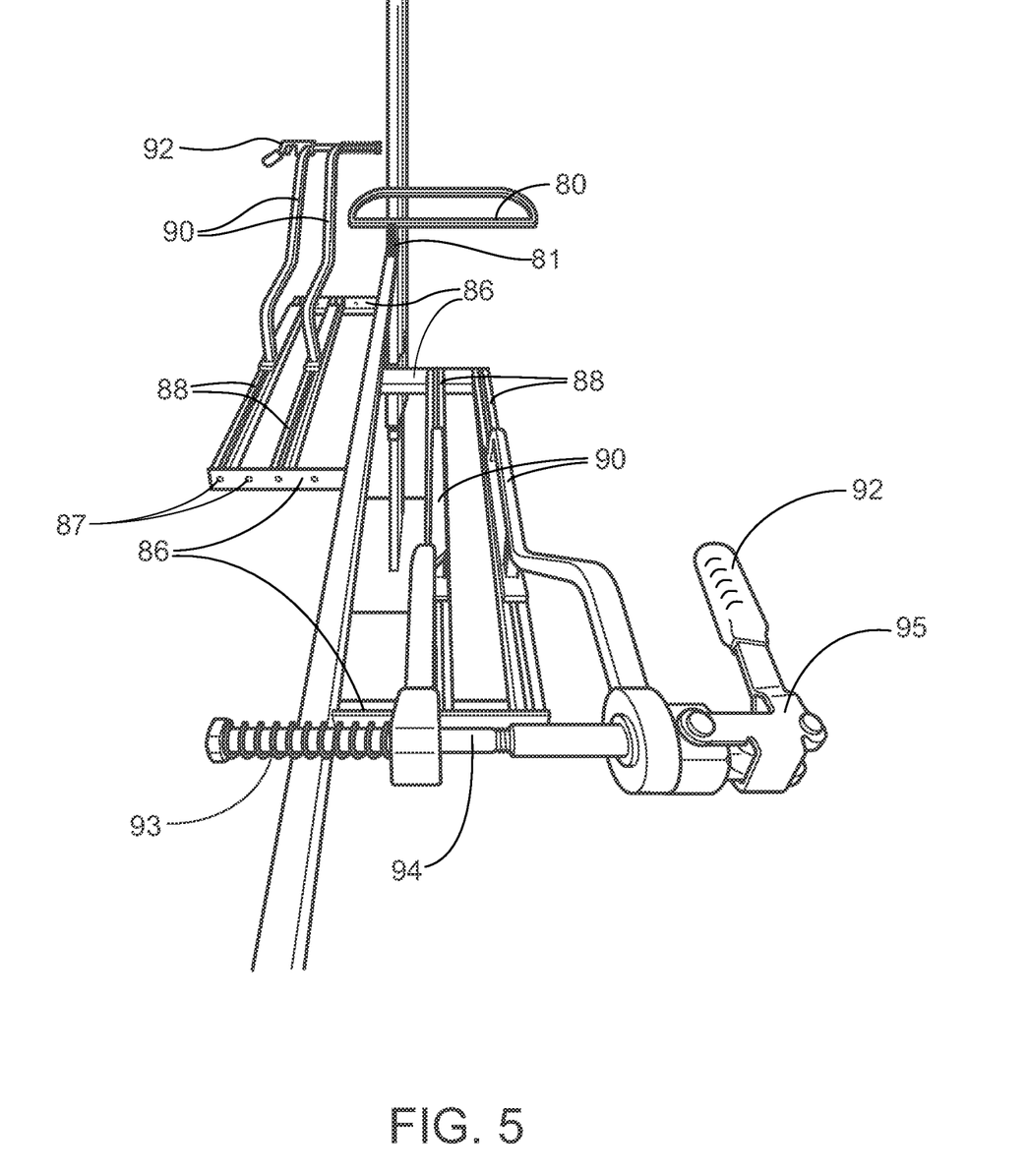
FIG. 5 illustrates a lift and storage device with a single support tray according to the invention.
Figure 6:
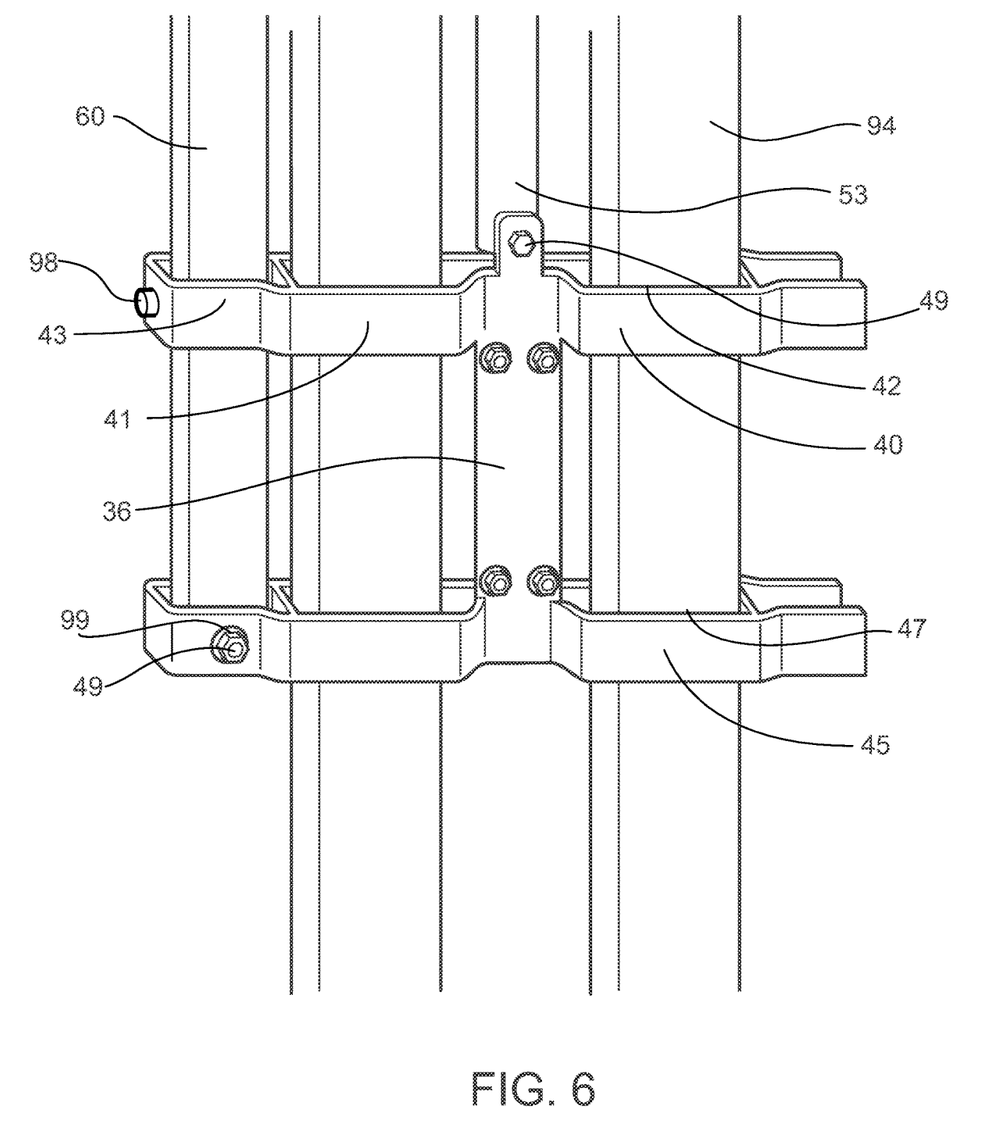
FIG. 6 illustrates a component of a lift and storage device according to the instant invention.
Figure 7:
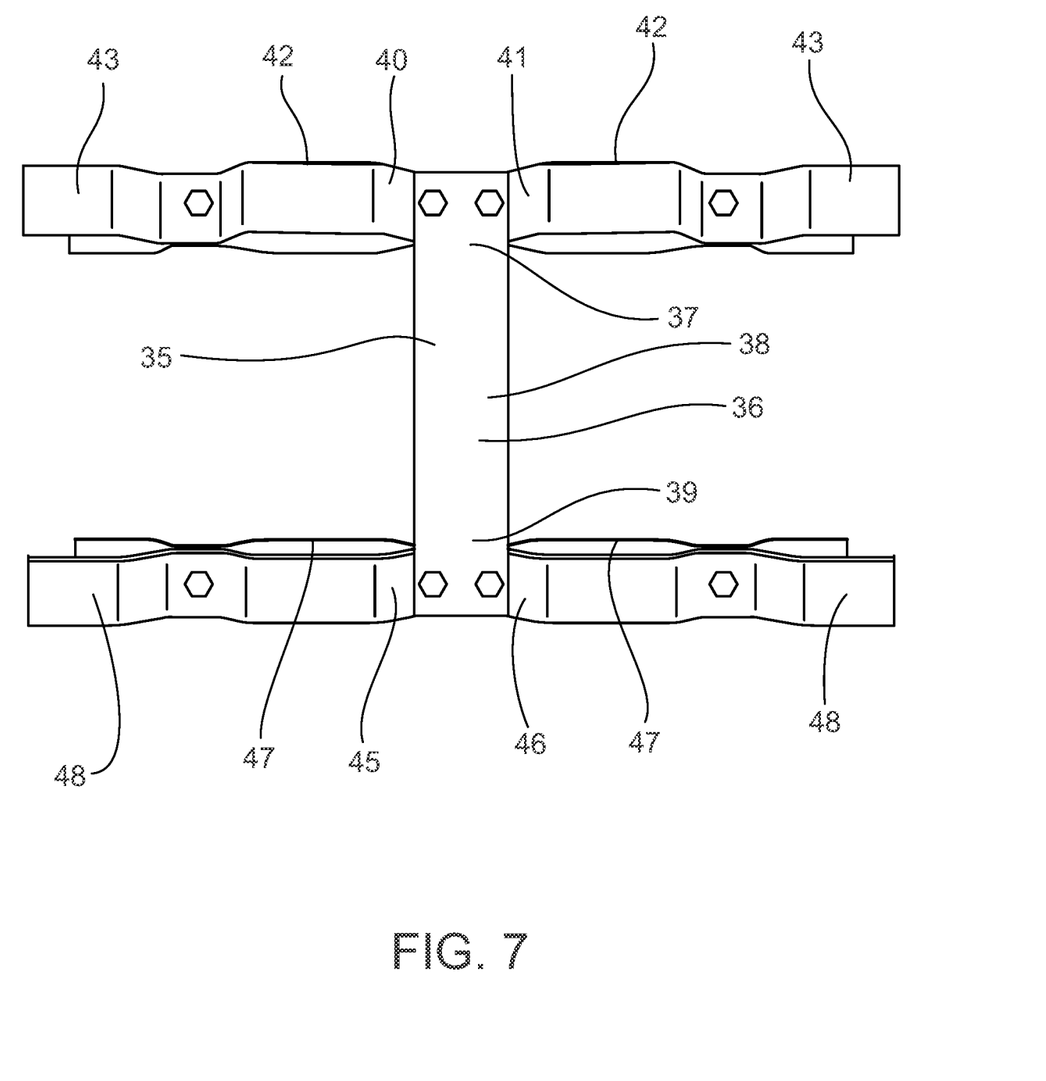
FIG. 7 illustrates a component of a lift and storage device according to the instant invention.

A drive assembly 50 is secured to and operationally associated with the support structure 20 and the travelling assembly 35, wherein the drive assembly 50 raises and lowers the travelling assembly 50. The drive assembly 50 can be an actuator which includes a main rod shaft 51 which is raised into and lowered out from a main rod housing 55. The actuator can be any design known in the art capable of raising and lowering one or more support trays 70 as described in the current invention. The main rod shaft includes a proximal end 52, a distal end 53, and a body 54. The distal end 53 is engaged and secured to the travelling assembly 35. FIG. 6 illustrates the main rod shaft 51 engaged with the upper bracket 40 with a fastener 49. The main rod housing 55 is engaged to the drive assembly at its proximal end 56 and includes a body 58 and a distal end secured in place (i.e., to a top place 30). As the drive assembly raise the travelling assembly 35, the proximal end 53 of the main rod shaft 51 is inserted into the lumen of the main rod housing 55. The drive assembly 50 may also be a winch and pully system which allows a user to raise and lower one or more support trays 70 manually or through automation. The drive assembly 50 may also operate by hydraulics (i.e., the use of hydraulic motor(s) and hydraulic cylinder(s)) to raise and lower one or more support trays 70.

A support arm 60 is secured to and operationally associated with the travelling assembly 50. The support arm can include a vertical member 61 secured to the traveling assembly 50 at a first end 62 of the vertical member 61 and a horizontal support member 71 of the support tray 70 secured to a second end 63 of the vertical member 61 and emanating away from the support structure 20. The components of the support arm 60 can be made from any material known in the art. These materials include, metals, plastics, woods, ceramics, or a combination thereof. The components of the support arm 60 can be secured by any means known in the art including, but not limited to, adhesives, bolts, welds, fasteners, or the like.

The support tray 70 is designed to store bicycles and other cumbersome items. The support tray includes a horizontal support member 71 with a first end 72 and second end 73. The horizontal support member 71 is secured to the support arm 60. A front tire support assembly 80 is secured to the first end 72 of the horizontal support member 71. The front tire support assembly 80 includes a mounting rail 81 secured at one end to the horizontal support member 71 and a support rail 82 secured to the opposite end of the mounting rail 81. As illustrated in the figures, the support rail 82 can be oval or rectangular in shape to accommodate a bicycle tire. The front tire support assembly 80 can be mounted parallel to the horizontal support member 71, perpendicular to the horizontal support member 71, or at any angle in between. A rear tire support assembly 85 is secured to the horizontal support member 71. The rear tire support assembly 85 includes a pair of adjustment rails 86 secured to the horizontal support member 71, a pair of slide rails 88 mounted parallel to one another and secured to the pair of adjustment rails 86, and a pair of support rails 90 slidably engaged with the pair of slide rails 88. Each adjustment rail 86 can include one or more through-holes 87 allowing a fastener to pass through the body of the adjustment rail to engage in an end of a slide rail 88. Each adjustment rail 86 can include a channel (not shown) extending a portion or the length of the adjustment rail 86 allowing a fastener to pass through the body of the adjustment rail 86 to engage in an end of a slide rail 88. The through-holes 87 and/or channel allow for the horizontal adjustment of the slide rails 88 and allowing for the adjustment of the distance between the slide rails 88 allowing for the adjustment for different widths of tires between the support rails. Each slide rail 88 includes a channel 89 extending a portion or the length of the slide rail 88 allowing a support rail 90 to be slidably engaged with the slide rail 88. The slidable nature of the support rails 90 of the rear tire support assembly 85 allows for the adjustment of the distance between the front tire support assembly 80 and the rear tire support assembly 85. A clamping assembly 92 is operationally associated with the pair of support rails 90 to secure a tire within the rear tire support assembly 85. The clamping assembly 92 includes a rod 94 passing through an opening at the end of each support rail 90, a compression spring 93 at one end of the rod, and a clamping lever 95 at the opposite end of the rod. The compression spring 93 allows for the adjustment of the amount of compression offered by the clamping assembly. The clamping lever 95 is engaged to decrease the space between the pair of support rails 90 and secure a tire in a desired position therebetween. The components of the support tray 70 can be made from any material known in the art. These materials include, metals, plastics, woods, polymers, ceramics, or a combination thereof. The components of the support tray 70 can be secured by any means known in the art including, but not limited to, adhesives, bolts, welds, fasteners, or the like. As with the horizontal support member 71, the front tire support assembly 80 can be mounted parallel to the rear tire support assembly 85, perpendicular to the rear tire support assembly 85, or at any angle in between.

The lift and storage device 10 may also include a second support arm 60 (as described above) secured to the opposite side of the travelling assembly 35 and operationally associated with the travelling assembly 35, the second support arm 60 designed for supporting a second support tray 70 (as described above) including a horizontal support member 71 secured to the support arm 60, a front tire support assembly 80 secured to a first end 72 of the horizontal support member 71, a rear tire support assembly 85 secured to the horizontal support member 71, the rear tire support assembly (as described above) comprising, a pair of adjustment rails 86 secured to the horizontal support member 71, a pair of slide rails 88 mounted parallel to one another and secured to the pair of adjustment rails 86, and a pair of support rails 90 slidably engaged with the pair of slide rails 88. A clamping assembly 92 is operationally associated with pair of support rails 90 to secure a tire within the rear tire support assembly 85. As stated previously, the slidable nature of the support rails 90 of the rear tire support assembly 85 allows for the adjustment of the distance between the front tire support assembly 80 and the rear tire support assembly 85.

The lift and storage device 10 comprising a bracket or rack operationally associated with the support arm 60, the bracket or rack designed to secure one or more cumbersome items including, but not limited to, golf bags, scooters, paddle boards, surf boards, water skis, camping equipment, or combinations thereof.

When in use, the support tray 70 begins at a first position at ground level allowing one or more bicycle(s) and/or other cumbersome items to be secured on the support tray and the support tray 70 is then raised to a second position to store the bicycle(s) and/or other cumbersome items.

One embodiment of the instant invention includes a lift and storage device 10 comprising a base 15, a support structure 20 secured to and emanating up from the upper surface 16 of the base 15, a travelling assembly 35 operationally associated with the support structure 20, a drive assembly 50 operationally associated with the support structure 20 and the travelling assembly 35, wherein the drive assembly 50 raises and lowers the travelling assembly 50. A support arm 60 is secured to and operationally associated with the travelling assembly 50, the support arm 60 designed for supporting a support tray 70 comprising a horizontal support member 71 secured to the support arm 60, a first front tire support assembly 80 secured to a first end 72 of the horizontal support member 71, and a second front tire support assembly secured to a second end of the horizontal support member. A first rear tire support assembly 85 is secured to the horizontal support member 71 and a second rear tire support assembly is secured to the opposite side of the horizontal support member. Each rear tire support assembly includes a pair of adjustment rails 86 secured to the horizontal support member 71, a pair of slide rails 88 mounted parallel to one another and secured to the pair of adjustment rails 86 and a pair of support rails 90 slidably engaged with the pair of slide rails 88. A clamping assembly 92 is operationally associated with the pair of support rails 90 to secure a tire within the rear tire support assembly 85. Each rear tire support assembly 85 allows for the adjustment of the distance between the front tire support assembly 80 and the rear tire support assembly 85. This embodiment may incorporate any of the design element stated previously, and may also include a second support arm 60 secured to the opposite side of the travelling assembly 35 and operationally associated with the travelling assembly, essentially doubling the storage capability as described above.

The instant invention also includes a method of storing one or more bicycles and/or cumbersome items comprising the steps of:
(a) providing a lift and storage device 10 comprising:
a base 15, a support structure 20 secured to and emanating up from the upper surface 16 of the base 15, a travelling assembly 35 operationally associated with the support structure 20, a drive assembly 50 operationally associated with the support structure 20 and the travelling assembly 35, wherein the drive assembly 50 raises and lowers the travelling assembly 50, a support arm is 60 secured to and operationally associated with the travelling assembly 50, the support arm 60 is designed for supporting a support tray 70 comprising a horizontal support member 71 secured to the support arm 60, a front tire support assembly 80 secured to a first end 72 of the horizontal support member 71, a rear tire support assembly 85 secured to the horizontal support member 71, the rear tire support assembly 85 comprising a pair of adjustment rails 86 secured to the horizontal support member 71, a pair of slide rails 88 mounted parallel to one another and secured to the pair of adjustment rails 86 and a pair of support rails 90 slidably engaged with the pair of slide rails 88, and a clamping assembly 92 is operationally associated with the pair of support rails 90 to secure a tire within the rear tire support assembly 85;
(b) placing the support tray 70 at a first position at ground level;
(c) loading one or more bicycles onto the support tray by:
(d) placing a front tire of a bicycle into the front tire support assembly 80;
(e) adjusting a distance between the front tire support assembly and the rear tire support assembly to fit the bicycle;
(f) placing a rear tire of the bicycle into the rear tire support assembly; and
(g) engaging the clamping assembly to decrease a distance between the pair of support rails to secure the rear tire within the rear tire support assembly;
(h) raising the support tray to a second position to store the bicycle(s) by engaging the drive assembly.

Any method described herein may incorporate any design element contained within this application and any other document/application incorporated by reference herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

The present invention may be embodied in other forms without departing from the spirit and the essential attributes thereof, and, accordingly, reference should be made to the appended claims, rather than to the foregoing specification, as indicating the scope of the invention. The invention illustratively disclosed herein suitably may be practiced in the absence of any element which is not specifically disclosed herein.

The invention claimed is:
1. A lift and storage device comprising:
a base;
a support structure secured to and emanating up from the base;
a travelling assembly operationally associated with the support structure;
a drive assembly operationally associated with the support structure and the travelling assembly, wherein the drive assembly raises and lowers the travelling assembly;
a support arm secured to and operationally associated with the travelling assembly, the support arm designed for supporting a support tray, the support tray comprising;
a horizontal support member secured to the support arm;
a front tire support assembly secured to a first end of the horizontal support member;
a rear tire support assembly secured to the horizontal support member, the rear tire support assembly comprising:
a pair of adjustment rails secured to the horizontal support member;
a pair of slide rails mounted parallel to one another and secured to the pair of adjustment rails; and
a pair of support rails slidably engaged with the pair of slide rails; and
a clamping assembly operationally associated with the pair of support rails to secure a tire within the rear tire support assembly;
the rear tire support assembly allowing for the adjustment of a distance between the front tire support assembly and the rear tire support assembly.

2. The device of claim 1 wherein the support arm includes:
a vertical member secured to the traveling assembly at a first end of the vertical member; and
the horizontal support member of the support tray secured to a second end of the vertical member and emanating away from the support structure.

3. The device of claim 1 wherein the drive assembly is selected from the group comprising: an actuator, a winch, a winch and pulley, or a combination thereof.

4. The device of claim 1 wherein the front tire support assembly is mounted perpendicular to the rear tire support assembly.

5. The device of claim 1 wherein:
the support tray begins at a first position at ground level allowing one or more bicycles to be secured on the support tray; and
the support tray is then raised to a second position to store the bicycle(s).

6. The device of claim 1 further comprising:
a second support arm secured to the opposite side of the travelling assembly and operationally associated with the travelling assembly, the second support arm designed for supporting a second support tray, the second support tray comprising;
 a horizontal support member secured to the support arm;
 a front tire support assembly secured to a first end of the horizontal support member;
 a rear tire support assembly secured to the horizontal support member, the rear tire support assembly comprising:
  a pair of adjustment rails secured to the horizontal support member;
  a pair of slide rails mounted parallel to one another and secured to the pair of adjustment rails; and
  a pair of support rails slidably engaged with the pair of slide rails; and
  a clamping assembly operationally associated with pair of support rails to secure a tire within the rear tire support assembly;
  the rear tire support assembly allowing for the adjustment of a distance between the front tire support assembly and the rear tire support assembly.

7. The device of claim 1 further comprising a bracket or rack operationally associated with the support arm, the bracket or rack designed to secure one or more cumbersome items including, but not limited to, golf bags, scooters, paddle boards, surf boards, water skis, camping equipment, or combinations thereof.

8. A lift and storage device comprising:
a base;
a support structure secured to and emanating up from the base;
a travelling assembly operationally associated with the support structure;
a drive assembly operationally associated with the support structure and the travelling assembly, wherein the drive assembly raises and lowers the travelling assembly;
a support arm operationally associated with the travelling assembly, the support arm designed for supporting a support tray, the support tray comprising;
 a horizontal support member secured to the support arm;
 a first front tire support assembly secured to a first end of the horizontal support member;
 a second front tire support assembly secured to a second end of the horizontal support member;
 a first rear tire support assembly secured to one side of the horizontal support member;
 a second rear tire support assembly secured to the opposite side of the horizontal support member;
 each rear tire support assembly comprising:
  a pair of adjustment rails secured to the horizontal support member;
  a pair of slide rails mounted parallel to one another and secured to the pair of adjustment rails; and
  a pair of support rails slidably engaged with the pair of slide rails; and
  a clamping assembly operationally associated with pair of support rails to secure a tire within the rear tire support assembly;
  the rear tire support assembly allowing for the adjustment of a distance between the front tire support assembly and the rear tire support assembly.

9. The device of claim 8 wherein the support arm includes:
a vertical member secured to the traveling assembly at a first end of the vertical member; and
the horizontal support member of the support tray secured to a second end of the vertical member and emanating away from the support structure.

10. The device of claim 8 wherein the drive assembly is selected from the group comprising: an actuator, a winch, a winch and pulley, or a combination thereof.

11. The device of claim 8 wherein the front tire support assembly is mounted perpendicular to the rear tire support assembly.

12. The device of claim 8 wherein:
the support tray begins at a first position at ground level allowing one or more bicycles to be secured on the support tray; and
the support tray is then raised to a second position to store the bicycle(s).

13. The device of claim 8 further comprising:
a second support arm secured to the opposite side of the travelling assembly and operationally associated with the travelling assembly, the second support arm designed for supporting a second support tray, the second support tray comprising;
 a horizontal support member secured to the support arm;
 a first front tire support assembly secured to a first end of the horizontal support member;
 a second front tire support assembly secured to a second end of the horizontal support member;
 a first rear tire support assembly secured to one side of the horizontal support member;
 a second rear tire support assembly secured to the opposite side of the horizontal support member;
 each rear tire support assembly comprising:
  a pair of adjustment rails secured to the horizontal support member;
  a pair of slide rails mounted parallel to one another and secured to the pair of adjustment rails; and
  a pair of support rails slidably engaged with the pair of slide rails; and
  a clamping assembly operationally associated with pair of support rails to secure a tire within the rear tire support assembly;
  the rear tire support assembly allowing for the adjustment of a distance between the front tire support assembly and the rear tire support assembly.

14. The device of claim 8 further comprising a bracket or rack operationally associated with the support arm, the bracket or rack designed to secure one or more cumbersome items including, but not limited to, golf bags, scooters, paddle boards, surf boards, water skis, camping equipment, or combinations thereof.

15. A method of storing one or more bicycles comprising the steps of:
 providing a lift and storage device comprising:
  a base;
  a support structure secured to and emanating up from the base;
  a travelling assembly operationally associated with the support structure;
  a drive assembly operationally associated with the support structure and the travelling assembly, wherein the drive assembly raises and lowers the travelling assembly;
  a support arm operationally associated with the travelling assembly, the support arm designed for supporting a support tray, the support tray comprising;
   a horizontal support member secured to the support arm;
   a first front tire support assembly secured to a first end of the horizontal support member;
   a second front tire support assembly secured to a second end of the horizontal support member;
   a first rear tire support assembly secured to one side of the horizontal support member;
   a second rear tire support assembly secured to the opposite side of the horizontal support member;
   each rear tire support assembly comprising:
    a pair of adjustment rails secured to the horizontal support member;
    a pair of slide rails mounted parallel to one another and secured to the pair of adjustment rails; and
    a pair of support rails slidably engaged with the pair of slide rails; and
    a clamping assembly operationally associated with pair of support rails to secure a tire within the rear tire support assembly;
 placing the support tray at a first position at ground level;
 loading one or more bicycles onto the support tray by:
  placing a front tire of a bicycle into the front tire support assembly;
  adjusting a distance between the front tire support assembly and the rear tire support assembly to fit the bicycle;
  placing a rear tire of the bicycle into the rear tire support assembly; and
  engaging the clamping assembly to decrease a distance between the pair of support rails to secure the rear tire within the rear tire support assembly;
 raising the support tray to a second position to store the bicycle(s) by engaging the drive assembly.

16. The method of claim 15 wherein the support arm includes:
 a vertical member secured to the traveling assembly at a first end of the vertical member; and
 the horizontal support member of the support tray secured to a second end of the vertical member and emanating away from the support structure.

17. The method of claim 15 wherein the drive assembly is selected from the group comprising: an actuator, a winch, a winch and pulley, or a combination thereof.

18. The method of claim 15 wherein the front tire support assembly is mounted perpendicular to the rear tire support assembly.

19. The method of claim 15 further comprising:
 providing a second support arm secured to the opposite side of the travelling assembly and operationally associated with the travelling assembly, the second support arm designed for supporting a second support tray, the second support tray comprising;
  a horizontal support member secured to the support arm;
  a first front tire support assembly secured to a first end of the horizontal support member;
  a second front tire support assembly secured to a second end of the horizontal support member;
  a first rear tire support assembly secured to one side of the horizontal support member;
  a second rear tire support assembly secured to the opposite side of the horizontal support member;
  each rear tire support assembly comprising:
   a pair of adjustment rails secured to the horizontal support member;
   a pair of slide rails mounted parallel to one another and secured to the pair of adjustment rails; and
   a pair of support rails slidably engaged with the pair of slide rails; and
   a clamping assembly operationally associated with pair of support rails to secure a tire within the rear tire support assembly;
 placing the second support tray at a first position at ground level;
 loading one or more bicycles onto the second support tray by:
  placing a front tire of a bicycle into the front tire support assembly;
  adjusting a distance between the front tire support assembly and the rear tire support assembly to fit the bicycle;
  placing a rear tire of the bicycle into the rear tire support assembly; and
  engaging the clamping assembly to decrease a distance between the pair of support rails to secure the rear tire within the rear tire support assembly;
 raising both support trays to a second position to store the bicycle(s) by engaging the drive assembly.

20. The method of claim 15 further comprising a bracket or rack operationally associated with the support arm, the bracket or rack designed to secure one or more cumbersome items including, but not limited to, golf bags, scooters, paddle boards, surf boards, water skis, camping equipment, or combinations thereof.

* * * * *